US009740688B2

(12) United States Patent
Huang et al.

(10) Patent No.: US 9,740,688 B2
(45) Date of Patent: Aug. 22, 2017

(54) SYSTEM AND METHOD FOR TRAINING A MACHINE TRANSLATION SYSTEM

(71) Applicant: Alibaba Group Holding Limited, George Town, Grand Cayman (KY)

(72) Inventors: Rui Huang, Hangzhou (CN); Weihua Luo, Hangzhou (CN); Feng Lin, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 15/130,659

(22) Filed: Apr. 15, 2016

(65) Prior Publication Data

US 2016/0306794 A1 Oct. 20, 2016

(30) Foreign Application Priority Data

Apr. 20, 2015 (CN) .......................... 2015 1 0189039

(51) Int. Cl.
*G06F 17/28* (2006.01)
(52) U.S. Cl.
CPC ...... *G06F 17/2818* (2013.01); *G06F 17/2863* (2013.01)
(58) Field of Classification Search
CPC ............. G06F 17/2818; G06F 17/2827; G06F 17/289; G06F 17/271; G06F 17/2854;
(Continued)

(56) References Cited

U.S. PATENT DOCUMENTS 7,412,385 B2 * 8/2008 Brockett ............. G06F 17/2765
704/10
2004/0044530 A1 3/2004 Moore
(Continued)

FOREIGN PATENT DOCUMENTS

EP 1489523 A2 12/2004

OTHER PUBLICATIONS

Kumar et al. "Efficient Minimum Error Rate Training and Minimum Mayes-Risk Decoding for Translation Hypergraphs and Lattices"; Proceedings of the Joint Conference of the 47th annual Meeting of the ACL and the 4th International Joing Conference on Natural Language Processing of the AFNLP; vol. 1; Aug. 7, 2016; [Retrieved Oct. 25, 2016 from http://www.aclweb.org/anthology/P09-1]; abstract; p. 163, paragraphs 3-4; p. 164, paragraph 3; p. 166, paragraphs 2 and 8; p. 167, paragraphs 2, 4 to p. 168, paragraph 1; p. 168, parapraph 6.

*Primary Examiner* — Charlotte M Baker
(74) *Attorney, Agent, or Firm* — Shun Yao; Park, Vaughan, Fleming & Dowler LLP

(57) ABSTRACT

A machine translation training system is provided. The system includes a task distribution server, a plurality of mapping servers, and a plurality of reduction servers. During operation, the task distribution server is configured to distribute a first translation training task and a training corpus to the mapping servers and distribute a second translation training task and first translation training results received from the mapping servers to the reduction servers. A respective mapping server is configured to receive a portion of the training corpus and perform the first translation training task on the received portion of the training corpus. A respective reduction server is configured to receive a subset of the first translation training results that correspond to a same language element, perform the second translation training task on the received subset of the first translation training results, and output second translation training results.

20 Claims, 14 Drawing Sheets

(58) Field of Classification Search
CPC ..... G06F 17/2836; G10L 15/04; G10L 15/05; A63B 2024/0025; A63B 2102/22; A63B 2208/12; A63B 2220/13; A63B 2220/30
USPC .................................. 704/1, 2, 4, 9, 10, 245
See application file for complete search history.

(56) References Cited

U.S. PATENT DOCUMENTS

| | | | |
|---|---|---|---|
| 2007/0083357 A1* | 4/2007 | Moore ................ | G06F 17/2827 704/4 |
| 2008/0147378 A1 | 6/2008 | Hatt | |
| 2014/0207439 A1 | 7/2014 | Venkatapathy et al. | |
| 2015/0286629 A1* | 10/2015 | Abdel-Reheem ... | G06F 17/2827 704/9 |

* cited by examiner

| SOURCE LANGUAGE SENTENCE | TARGET LANGUAGE SENTENCE |
|---|---|
| 我想买个苹果 | I want to buy an apple |
| 我有一个苹果 | I have an apple |
| 我有一本书 | I have a book |
| 我想买本书 | I want to buy a book |

| SOURCE LANGUAGE WORD | TARGET LANGUAGE WORD AND ALIGNMENT PROBABILITY | |
|---|---|---|
| 我 | I | 0.5 |
| 我 | Want | 0.1 |

| SOURCE LANGUAGE WORD | TARGET LANGUAGE WORD AND ALIGNMENT PROBABILITY | |
|---|---|---|
| 想 | I | 0.1 |
| 想 | Want | 0.5 |

| SOURCE LANGUAGE WORD | TARGET LANGUAGE WORD AND CONDITIONAL-TRANSLATION PROBABILITY |
|---|---|
| 我 | I   0.5/(0.5+0.1)=5/6 |
| 我 | Want   0.1/(0.5+0.1)=1/6 |

FIG. 4D

| SOURCE LANGUAGE WORD | TARGET LANGUAGE WORD AND CONDITIONAL-TRANSLATION PROBABILITY |
|---|---|
| 想 | I   0.1/(0.1+0.5)=1/6 |
| 想 | Want   0.5/(0.1+0.5)=5/6 |

FIG. 4E

| SOURCE LANGUAGE WORD | TARGET LANGUAGE WORD | FORWARD CONDITIONAL TRANSLATION PROBABILITY |
|---|---|---|
| 我 | I | 5/7 |
| 我 | Want | 1/7 |
| 我 | To | 1/7 |
| 我 | Buy | 1/7 |
| 我 | An | 1/7 |
| 我 | Apple | 1/7 |

FIG. 4F

| SOURCE LANGUAGE WORD | TARGET LANGUAGE WORD |
|---|---|
| 我 | I |
| 一个 | an |
| 想 | Want to |
| 苹果 | Apple |

FIG. 6A

| SOURCE LANGUAGE WORD | TARGET LANGUAGE WORD |
|---|---|
| 我 | I |
| 一个 | a |
| 想 | Want to |
| 书 | Book |

FIG. 6B

| SOURCE LANGUAGE PHRASE | TARGET LANGUAGE PHRASE |
|---|---|
| 我想 | I want to |
| 买一个 | Buy an |
| 有一个 | Have an |
| 苹果 | Apple |

FIG. 7A

| SOURCE LANGUAGE PHRASE | TARGET LANGUAGE PHRASE |
|---|---|
| 我想 | I want to |
| 买一个 | Buy a |
| 有一个 | Have a |
| 书 | Book |

FIG. 7B

| N | N-GRAMS |
|---|---|
| 1 | 我, 想, 买, 个, 苹, 果 |
| 2 | 我想, 想买, 买个, 个苹, 苹果 |
| 3 | 我想买, 想买个, 买个苹, 个苹果 |

FIG. 9A

| N-GRAM | COUNT |
|---|---|
| 我想 | 2 |
| 我有 | 2 |
| 我 | 4 |

FIG. 9B

SYSTEM AND METHOD FOR TRAINING A MACHINE TRANSLATION SYSTEM

RELATED APPLICATION

Under 35 U.S.C. §119, this application claims the benefit and right of priority of Chinese Patent Application No. 201510189039.7, filed 20 Apr. 2015.

BACKGROUND

Field

The present application relates to a novel machine translation system. More specifically, the present application relates to a system and method for training the machine translation system. In addition, the present application also relates to a system and method for online translation.

Related Art

Machine translation (MT), also known as automated translation, refers to a process that uses computers to translate text or speech from one language ("source language") to another ("target language"). On a basic level, machine translation performs simple substitution of words in one language for words in another, but that alone usually cannot produce a good translation of a text. To achieve a good translation, recognition of whole phrases or complete sentences and their closest counterparts in the target language is needed.

Statistical machine translation (SMT) is the most widely studied and used MT method. For example, Google® Translate implements SMT. In SMT, translations are generated on the basis of statistic models whose parameters are derived from analysis of bilingual text corpora. The various statistic models, including word-alignment model, phrase-extraction model, and language model are basic components of the SMT technology. To build a good SMT system, a large amount of training data is needed to train each of these basic components. Similarly, upgrading an SMT system can involve repeated training of these basic components.

In conventional approaches, MT training typically is performed on a single standalone machine. However, accurate translations often depend on multiple training runs over a large amount of training data, making it inefficient to perform training on a single machine. For example, a good MT system may need a training corpus containing well beyond 10 million sentences. A complete training run of the MT system using a server with 32 cores and 128 GB RAM can require up to 60 hours. Because upgrading a commercial MT system can involve multiple iterations of training runs and tests, offline training of the various models (e.g., word-alignment model, phrase-extraction model, language model, etc.) can become the bottleneck for upgrading the MT system.

Moreover, the training results from a single machine are often loaded into the memory of a single machine to allow subsequent queries of the training results during the online translation process. However, loading the massive amounts of data containing the training results into a single machine can result in a slower query speed and, thus, less efficient translation.

SUMMARY

One embodiment of the present invention provides a machine translation training system. The system includes a task distribution server, a plurality of mapping servers, and a plurality of reduction servers. During operation, the task distribution server is configured to distribute a first translation training task and a training corpus to the mapping servers and distribute a second translation training task and first translation training results received from the mapping servers to the reduction servers. A respective mapping server is configured to receive a portion of the training corpus and perform the first translation training task on the received portion of the training corpus. A respective reduction server is configured to receive a subset of the first translation training results that correspond to a same language element, perform the second translation training task on the received subset of the first translation training results, and output second translation training results.

In a variation on this embodiment, the training corpus includes a bilingual corpus. The first translation training task involves one or more of: computing a forward word-alignment probability indicating a likelihood that a source language word is aligned to a target language word, and computing a backward word-alignment probability indicating a likelihood that a target language word is aligned to a source language word. The first translation training results include one or more of: the computed forward word-alignment probability and the computed backward word-alignment probability.

In a further variation, the second translation training task involves one or more of: computing a forward conditional translation probability indicating a likelihood that a source language word is translated into a target language word, and computing a backward conditional translation probability indicating a likelihood that a target language word is translated into a source language word.

In a further variation, the language element is a source language word if the to-be-distributed first translation training results are forward word-alignment probabilities, and the language element is a target language word if the to-be-distributed first translation training results are backward word-alignment probabilities.

In a further variation, the task distribution server is further configured to distribute the second translation training results to the mapping servers. The mapping server is further configured to, in response to determining that the computed forward and/or backward conditional translation probabilities do not converge, update the forward and/or backward word-alignment probabilities; and, in response to determining that the computed forward and/or backward conditional translation probabilities converge, output a word-alignment table based on the computed forward and/or backward conditional translation probabilities.

In a variation on this embodiment, the training corpus includes a bilingual corpus. The first translation training task involves extracting, from a sentence pair belonging to the bilingual training corpus, one or more pairs of phrases; and outputting occurrence frequencies of the phrases. The second translation training task involves one of: computing a forward phrase-translation probability between a source language phrase and a target language phrase, and computing a backward phrase-translation probability between a target language phrase and a source language phrase.

In a further variation, the reduction server is further configured to, in response to determining that an occurrence frequency of an extracted phrase is less than a predetermined threshold, remove corresponding phrase pairs.

In a variation on this embodiment, the training corpus includes a monolingual corpus, the first translation training task involves performing n-gram segmentations over the monolingual corpus, the first translation training results include n-grams, the second translation training task involves computing n-gram statistics, and the second translation training results include occurrence frequencies of the n-grams.

In a variation on this embodiment, the training corpus includes n-grams obtained from segmenting a monolingual corpus, the first translation training task involves performing prefix segmentation of the n-grams, the first translation training results include prefixes of the n-grams, and the second translation training task involves computing posterior probabilities and/or back-off probabilities of the n-grams.

In a variation on this embodiment, the training corpus includes n-grams obtained from segmenting a monolingual corpus, the first translation training task involves performing suffix segmentation of the n-grams, the first translation training results include suffixes of the n-grams, and the second translation training task involves smoothing probabilities of the n-grams.

BRIEF DESCRIPTION OF THE FIGURES

FIGS. 4D-4E present tables showing exemplary outputs of the first and second reduction nodes, in accordance with an embodiment of the present invention.

FIG. 4F presents a table showing an exemplary word translation table received by a mapping node.

FIGS. 6A-6B present word-alignment tables computed at two different mapping nodes.

FIGS. 7A-7B present phrase-alignment tables computed at two different mapping nodes.

FIG. 9A presents a table showing the n-grams outputted by a mapping node, in accordance with an embodiment of the present invention.

FIG. 9B presents a table showing the outputs of the reduction nodes, in accordance with an embodiment of the present invention.

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a novel machine translation (MT) system that implements distributed training. More specifically, this novel MT training system can include three main modules: the word-alignment training module, the phrase-extraction training module, and the language-modeling module. Each of the three main modules can be trained in a distributed manner on a parallel cluster of machines, using the MapReduce programming model. When training the word-alignment model, the system simultaneously computes the word-alignment table in both forward and backward directions, and uses matrix compression and dynamic memory loading techniques to reduce resource usage at each cluster node. The system can further take advantage of the data-skew phenomenon in the training corpus to pre-filter the training data, thus significantly increasing the training speed. When training the phrase-extraction model, the system parallelly computes, in both directions, the word translation probabilities and the phrase translation probabilities. To reduce the size of the phrase-extraction model, the system can also compute the significance level of the phrases to filter out insignificant phrases. The distributed training of the language model involves parallel computation of n-gram occurrence frequencies, and the posterior probabilities and back-off probabilities of the n-grams. Training of the language model can also involve probability smoothing and pruning, resulting in an approximate 20% reduction in training time compared with that of conventional approaches.

Statistical Machine Translation

Figure 1:
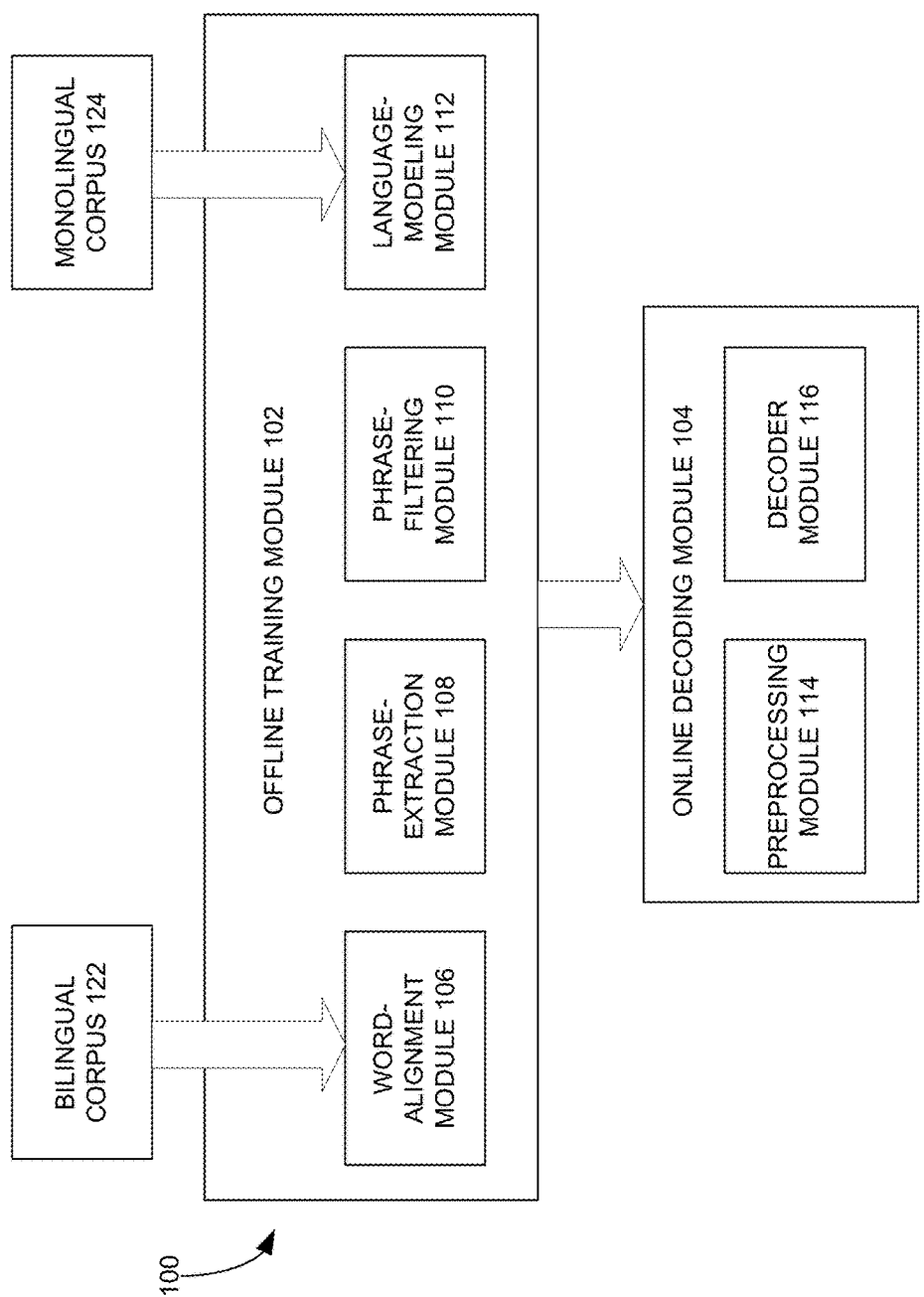
FIG. 1 presents a diagram illustrating an exemplary statistical machine translation (SMT) framework.

FIG. 1 presents a diagram illustrating an exemplary statistical machine translation (SMT) framework. SMT framework 100 typically can include an offline training module 102 and an online decoding module 104. Offline training module 102 includes a word-alignment module 106, a phrase-extraction module 108, a phrase-filtering module 110, and a language-modeling module 112. Online decoding module 104 includes a pre-processing module 114 and a decoder 116.

During offline training, word-alignment module 106 obtains a bilingual corpus 122 (also known as a parallel corpus), which includes bilingual texts, and aligns words between the source text and the target text based on statistics. For example, given a bilingual sentence pair (e.g., a source language sentence and a target language sentence that are translations of each other) from bilingual corpus 122, word-alignment module 106 can identify the translation relationship between words of the two languages.

Phrase-extraction module 108 takes the output of word-alignment module 106, extracts, from the bilingual sentence pairs, phrase pairs that are translations of each other, and outputs a phrase table. Phrase-extraction module 108 can also compute various statistics, such as forward translation probabilities, backward translation probabilities, etc. The number and accuracy of the extracted phrase pairs determine the quality of the statistic model, and eventually affect the quality of the machine translated text. Phrase-filtering module 110 filters insignificant or erroneous phrases that were in the phrase table. This can reduce the size of the phrase table, making it possible to obtain an optimal translation outcome during decoding.

Language-modeling module 112 can be used to establish a language model, which can be used to determine the probability of a sentence and its fluency. Given a word sequence, language-modeling module 112 can predict the most probable next word. To establish the language model, language-modeling module 112 takes a monolingual corpus 124 as input and computes n-gram statistics. More specifically, it can compute the probability distribution function of each n-gram, and smooth the result.

During online decoding, pre-processing module 114 receives a translation request from a user, and decoder 116 queries the MT training results (often stored in a database) to generate the best sequence of words in the target language that corresponds to the word sequence in the source language.

Conventional SMT technologies often perform trainings of the various models on a single server machine. The offline training of the various models can consume a large amount of time and resources, and have stringent requirements over the server resources (e.g., memory, CPU, hard drive, etc.). The following analysis will discuss the shortcomings of a number of currently available training tools.

For word-alignment training, a typical training tool, such as GIZA++, aligns the words in one direction, meaning that the word-alignment training needs to be carried out twice, one from the source language to the target language, and the other from the target language to the source language. This reduces the training efficiency. In addition, most training tools are designed to run on a standalone computer in a single-thread mode, and can be very slow when training over a large parallel corpus. For example, completing word-alignment training over a Chinese-English parallel corpus having 10 million sentences (roughly 300 million words in total) can take up to six days if running on a 2.4 GHz Intel Xeon server.

Although a number of parallel word-alignment training systems have been developed, such as MGIZA++ and PGIZA++, they still have limited performance efficiency. For example, the multi-thread training tool MGIZA++ requires higher performance computers, because its speed is limited by the CPU and memory of the computers. PGIZA++, on the other hand, uses a distributed training algorithm and is free from the limitation of a standalone computer. However, the relatively high complexity of its training algorithm can still result in an unacceptably low training speed for a large-scale corpus. Some other distributed training tools use an expectation-maximization (EM) algorithm, which can generate a large number of parameters at each iteration. Distributing, at each iteration, the large number of parameters to each cluster node can be time consuming Data skewing is another problem faced by conventional training tools. Data skewing refers to the phenomenon that a few characters (e.g., certain common words and punctuations) have very high occurrence frequencies, which can lead to extremely long processing times. For example, if each sentence pair contains a punctuation mark "," and the number of words in each sentence pair is about 20 on average, then there can be 20 optional words aligned to this punctuation mark. For a training corpus having 30 million sentence pairs, this can mean that, during the reduce step of the training, entries corresponding to this punctuation mark can be up to six billion. Processing such a large number of entries can significantly increase the training time.

For phrase extraction and filtering, conventional training algorithms typically are executed in series for each sentence pair. This training process can be very slow. In addition, gathering phrase statistics over a large corpus can involve sorting through large amounts of data. For example, for a corpus containing 34 million sentence pairs, the number of extracted phrase pairs can be up to four billion, and the data file can have a size up to 50 GB. Performing statistical analysis on such data can consume a large amount of memory if performed on a standalone server. In addition, in conventional approaches, phrase filtering is a separate operation, and is often performed after the phrase statistics have been gathered based on the extracted phrase table. However, certain phrase statistics can be obtained during the phrase-extraction operation, and separating the phrase extraction and phrase filtering phases can result in repeated, wasteful computations.

When training the language model, conventional algorithms can involve extracting, in series, phrases from sentences, consolidating repeated phrases, and then using sorting or other complex data structures to identify phrase sets having similar prefixes to obtain phrase statistics. The collection of n-grams can be at least three to four times the size of the original corpus, and can lead to a very slow and resource-consuming training process.

Distributed Training of Statistical Machine Translation

To enhance the training efficiency, including both the speed and the resource usage, in some embodiments of the present invention, the various models can be trained in a distributed manner More specifically, a training system based on the MapReduce programming model can be used to train the various models in an MT system.

Figure 2:
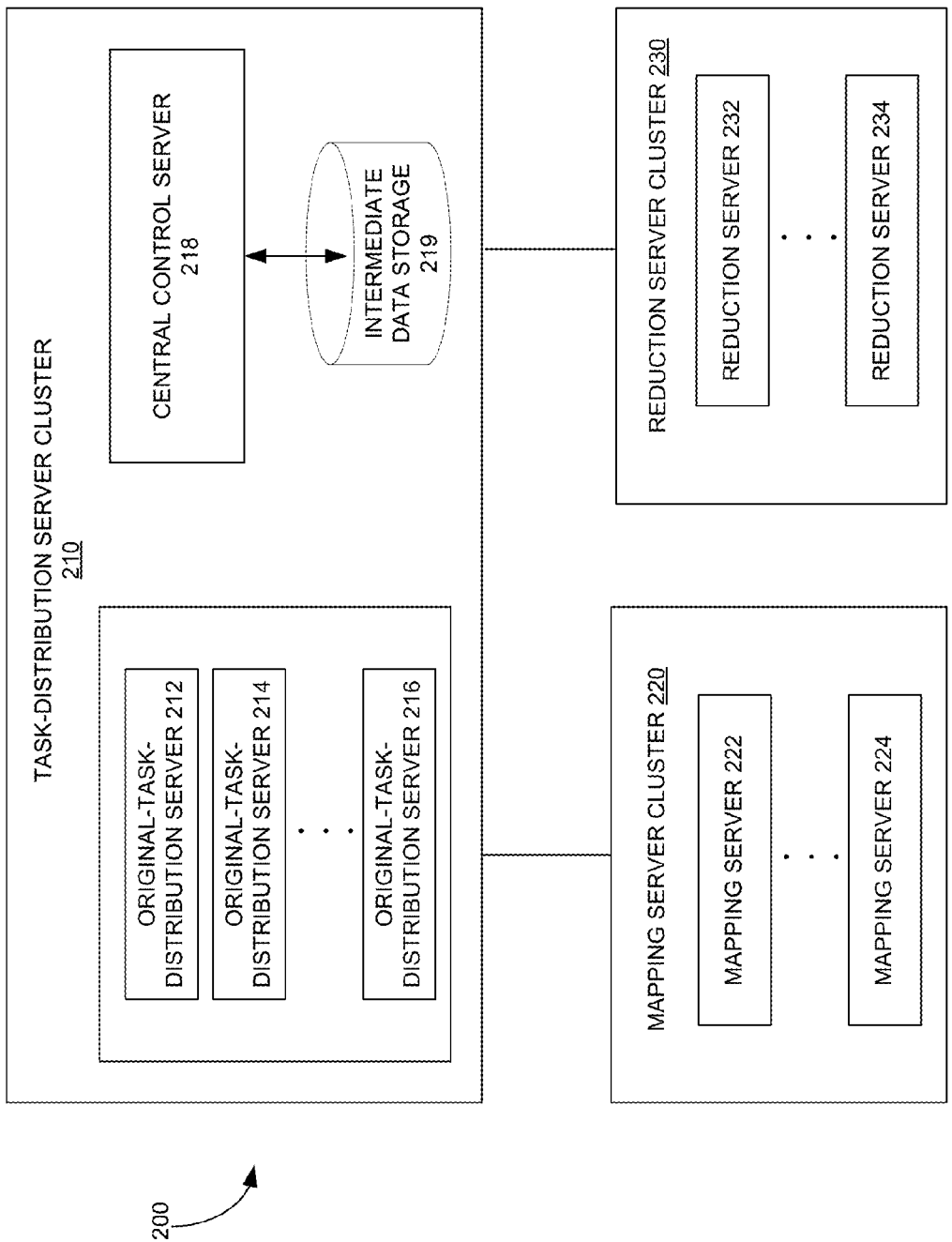
FIG. 2 presents a diagram illustrating the block diagram of an exemplary machine translation training system, in accordance with an embodiment of the present invention.

FIG. 2 presents a diagram illustrating the block diagram of an exemplary machine translation training system, in accordance with an embodiment of the present invention. In FIG. 2, training system 200 includes a task-distribution server cluster 210, a mapping server cluster 220, and a reduction server cluster 230.

Task-distribution server cluster 210 includes a number of original-task-distribution servers (e.g., original-task-distribution servers 212, 214, and 216), a central control server 218, and an intermediate data storage 219. Mapping server cluster 220 includes a number of mapping servers (e.g., mapping servers 222 and 224), also referred to as mappers. Reduction server cluster 230 includes a number of reduction servers (e.g., reduction servers 232 and 234), also referred to as reducers.

Task-distribution server cluster 210 can be configured to distribute the training corpus (monolingual or bilingual) to each worker node (e.g., a mapping server) of mapping server cluster 220, collect map-generated language-training results, and distribute the map-generated language-training results to each worker node (e.g., a reduction server) of reduction server cluster 230. Map-generated language-training results that share a common language element are sent to the same reduction server. In some embodiments, the one or more original-task-distribution servers can be responsible for splitting the training corpus, and distribute the corpus slices and the training task to appropriate mapping nodes to allow the mapping nodes to execute the training task. The outputs of the mapping nodes can be stored in intermediate data storage 219, which can also merge the mapping outputs having a common language element. Central control server 218 can control the operation of intermediate data storage 219 to allow it to distribute the map-generated language-training results that share a common language element to the same reduction server node.

Mapping server cluster 220 can include a large number (e.g., up to 1000) of server computers in order to process a large corpus. The mapping servers can perform the map step of the MapReduce operation. For example, for word-alignment training, the mapping servers can be configured to iterate over the training instances (e.g., bilingual sentence pairs) to compute the initial translation probability of each word in the source language with respect to each word in the target language, and vice versa.

The reduction servers included in reduction server cluster 230 can perform the reduce step of the MapReduce operation. Each reduction server can be configured to receive the map-generated language training results that share the same language element. For example, for word-alignment training, a particular reduction server can receive an initial translation probability of a particular word in the source language with respect to a word in the target language and compute the next iteration translation probability.

Figure 3:
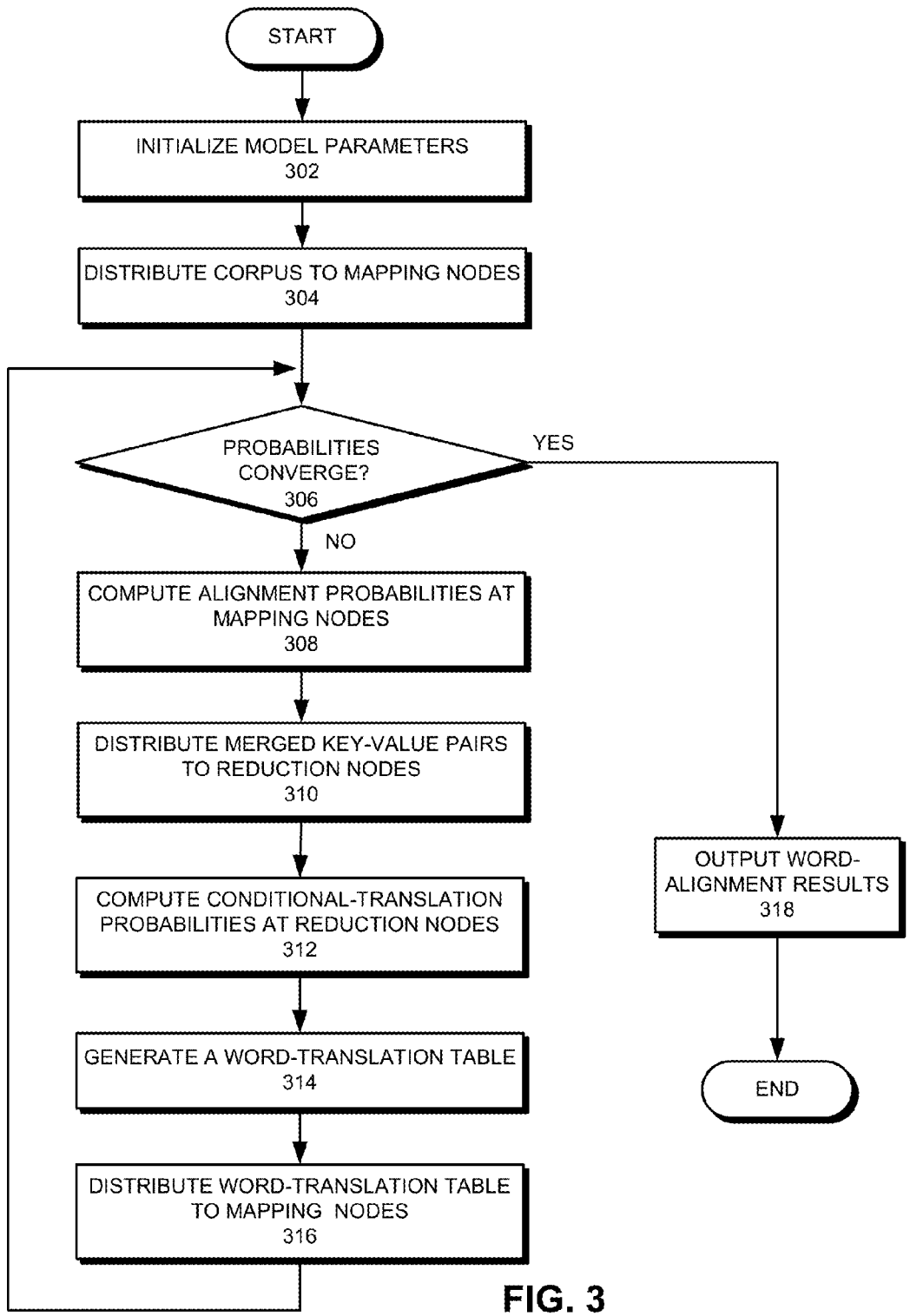
FIG. 3 presents a flowchart illustrating an exemplary process for training a word-alignment model, according to an embodiment of the present invention.

In some embodiments, for word-alignment training, the MT system implements the well-known IBM translation models, such as IBM model 2, which can be trained using the Expectation-Maximization (EM) algorithm. FIG. 3 presents a flowchart illustrating an exemplary process for training a word-alignment model, according to an embodiment of the present invention.

The training of the word-alignment model starts with initializing the model parameters, such as word-alignment probabilities, including both the forward (from source to target) and the backward (from target to source) alignment probabilities (operation 302). In some embodiments, the initial model parameters can be set as a uniform default number. For example, given a sentence pair, the initial translation probability of a word in the source sentence to any word in the target sentence can be set as a constant number.

Figures 4A, 4B, 4C:
FIG. 4A shows an exemplary Chinese-English bilingual corpus.
FIG. 4B presents a table showing exemplary key-value pairs distributed to a first reduction node, in accordance with an embodiment of the present invention.
FIG. 4C presents a table showing exemplary key-value pairs distributed to a second reduction node, in accordance with an embodiment of the present invention.

FIG. 4A shows an exemplary Chinese-English bilingual corpus. In FIG. 4A, Chinese-English bilingual corpus 400 includes four sentence pairs, with each sentence pair including a source language sentence and a target language sentence that are translations of each other. The bilingual corpus can be stored in a file of any format. For example, the corpus can be saved as a text file.

Return to FIG. 3. After initialization, the system distributes the bilingual corpus to a number of mapping nodes (operation 304). In some embodiments, the system can split the bilingual corpora into slices and distribute the slices to the mapping nodes. For example, bilingual corpus 400 can be split into two slices with each slice including two sentence pairs, and each slice can be distributed to a mapping node.

The mapping nodes can then determine whether the translation probabilities converge (e.g., the difference of the translation probability of a particular word pair between a previous iteration and the current iteration is less than a predetermined small value) (operation 306).

In the initial iteration, the translation probabilities are just the initial values assigned by the system, and certainly do not converge. The mapping nodes then compute, in a parallel fashion, alignment probabilities based on the received corpus slices (operation 308). For EM-based training, the mapping nodes are performing the Expectation (E) operation. More specifically, for a sentence pair (f, e), with f=($f_0$, $f_1$, ... $f_n$) representing the source language sentence and e=($e_0$, $e_1$, ... $e_m$) representing the target language sentence, the alignment probability for a word pair ($f_i$, $e_j$) can be computed as:

$$p(a_{ij}) = \frac{p(f_i | e_j)}{\sum_{k=0}^{m} p(f_i | e_k)},$$

where $a_{ij}$ represents an aligned word pair. Note that the initial conditional-translation probability $p(f_i|e_j)$ can be set as 1. A mapping node can then output a key-value pair, with $f_i$ being the key and ($e_j$, $p(a_{ij})$) being the value.

To simultaneously obtain both the forward and the backward alignment probabilities, the corpus slice can be sent to at least two mapping nodes, with one mapping node computing the forward alignment probability and the other computing the backward alignment probability. Hence, the key-value pairs outputted by the mapping nodes can also include the ones that use the target language word $e_j$ as the key and the source language word $f_i$ and the backward alignment probability $p(a_{ji})$ as the value.

Using bilingual corpus 400 as an example, the top two sentence pairs can be sent to a mapping node, which computes the initial word translation probabilities. There are seven English words in total in these two sentence pairs, and the common Chinese word "我" in the two Chinese sentences can correspond to any one of the seven English words. Consequently, the mapping node can output the initial alignment probability of the aforementioned Chinese word "我" with respect to any one of the seven English words as ⅟₇. The key-value pairs outputted by the mapping nodes can be temporarily stored in the intermediate data storage. These key-value pairs can be merged based on the sorting characteristics of the key. For example, the key-value pairs with the same key can be merged.

Subsequently, the system distributes the merged key-value pairs to reductions nodes (operation 310). More specifically, key-value pairs having the same key are sent to the same reduction node. FIG. 4B presents a table showing exemplary key-value pairs distributed to a first reduction node, in accordance with an embodiment of the present invention. FIG. 4C presents a table showing exemplary key-value pairs distributed to a second reduction node, in accordance with an embodiment of the present invention.

Back to FIG. 3. The reduction nodes can then compute the conditional-translation probability $p(f_i|e_j)$ based on the alignment probability outputted by the mapping nodes, using the following formula:

$$p(f_i | e_j) = \frac{p(a_{ij})}{\sum_{a_{ik} \in A} p(a_{ik})},$$

(operation 312). FIGS. 4D-4E present tables showing exemplary outputs of the first and second reduction nodes, in accordance with an embodiment of the present invention.

The system can then generate a word-translation table based on the conditional-translation probabilities (operation 314). Note that, for a large bilingual parallel corpus, the word-translation probability matrix can be extremely large. This means that the size of the file that stores the word-translation table can be extremely large. For example, if the parallel corpus includes M source language words and N target language words, the size of the word-translation probability matrix can be M×N. Given a bilingual corpus having 34 million words in total, the size of the file that stores the word-translation table can be up to 20 GB. Note that the word-translation table needs to be distributed back to the mapping nodes for the next iteration. The large file size makes file distribution difficult and inefficient. Moreover, the large file size also means that a large amount of internal memory is needed at each mapping node in order to load and query the word-translation table. This memory need can sometimes exceed the resource limits of typical distributed systems.

To reduce the file size, in some embodiments, the system can compress the word-translation probability matrix by filtering out matrix elements with smaller translation probabilities. For example, the system can remove matrix elements with $p(f_i|e_j)$ smaller than a predetermined threshold. After compression, the size of the word-translation probability matrix can be as small as 1/20 of the original matrix. In some embodiments, the outputs from all reduction nodes are combined into a single file, which can be compressed and distributed to the mapping nodes for the next iteration.

The generated word-translation table can then be distributed to the mapping nodes to allow the mapping nodes to perform the next iteration computation (operation 316). As discussed previously, each mapping node needs to load and query the word-translation table when computing the alignment probability $p(a_{ji})$. The word-translation table can still be relatively large, even after compression, meaning that loading and querying the word-translation table can consume a large amount of internal memory. The required memory can sometimes exceed the maximum amount of memory provided at each mapping node. To solve this problem, in some embodiments, the mapping nodes can dynamically load the word-translation table into the memory. More specifically, a mapping node can designate a buffer zone in its memory and load a portion of the word-translation table into the buffer. If, during computation, the mapping node cannot find needed data in the buffer, it can retrieve and load such data to the buffer from the hard disk. Although this may reduce the query speed, it relaxes the memory requirement of the mapping node, making it possible to train with large corpora.

Once the mapping nodes obtain both the forward and backward conditional-translation probabilities (embedded in the word-translation table), they can again determine whether the conditional-translation probabilities converge (operation 306). If so, the mapping nodes no longer need to compute the alignment probabilities. Instead, the mapping nodes can directly output the word-alignment results (operation 318). The target language word that is aligned to a source language word $f_i$ can be identified using:

$$a(f_i) = \arg\max_{0 \leq j \leq m} (p(f_i | e_j)).$$

In some embodiments, the mapping nodes can output a word-alignment table.

If the conditional-translation probabilities do not converge, the mapping nodes can again compute the alignment probabilities by plugging the reduce-generated conditional-translation probabilities into formula $$p(a_{ij}) = \frac{p(f_i|e_j)}{\sum_{k=0}^{m} p(f_i|e_k)}.$$

FIG. 4F presents a table showing an exemplary word translation table received by a mapping node. Using the data shown in FIG. 4F, a mapping node can compute the forward alignment probability from the source language word "我" to the target language word "I" as:

$$\frac{5/7}{5/7 + 1/7 + 1/7 + 1/7 + 1/7 + 1/7} = 0.5.$$

Note that if the received word-translation probability matrix has been previously compressed, and the computation calls for a word-translation probability that not included in the matrix, a default small value can be used instead.

The current iteration continues, including distributing mapping outputs (key-value pairs) to reduction nodes (operation 310) and computing conditional-translation probabilities (operation 312). Operations 306-316 repeat until the conditional-translation probabilities converge and the mapping nodes output the word alignment results (operation 318).

Note that, in preferred embodiments, both the forward and backward alignment/conditional-translation probabilities are computed simultaneously, thus significantly enhancing the training efficiency. It is also possible to separately compute the forward and backward alignment/conditional-translation probabilities and then merge the forward and backward results to obtain the final word-alignment results.

Figure 5:
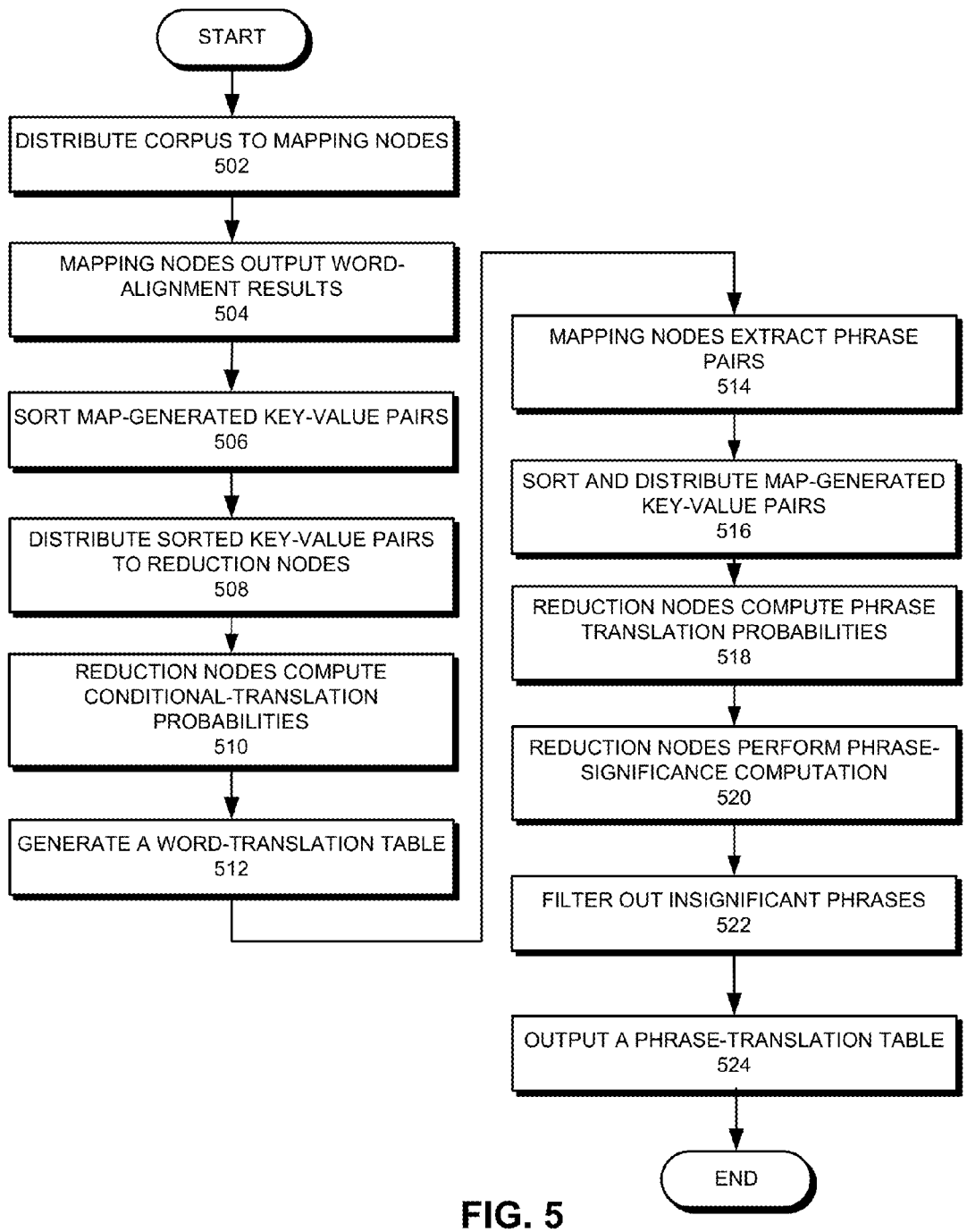
FIG. 5 presents a flowchart illustrating an exemplary process for training a phrase-extraction model, according to an embodiment of the present invention.

Once the system obtains the word-alignment results, it can extract phrase pairs that are aligned to each other, compute phrase statistics (e.g., forward phrase translation probabilities and backward phrase translation probabilities), and generate a phrase table. The size of the generated phrase table can be ten times the size of the training corpus. A typical phrase table can include redundant and sometimes erroneous phrase-alignment results. Hence, it is desirable to filter the phrase table to reduce its size. During decoding, the reduced phrase table can enhance the phrase-table loading speed, and both the decoding efficiency and accuracy. FIG. 5 presents a flowchart illustrating an exemplary process for training a phrase-extraction model, according to an embodiment of the present invention. Similar to the word-alignment training process shown in FIG. 3, the phrase extraction and filtering operations can also implement MapReduce.

The training of the phrase-extraction model starts with a word-alignment stage that can be similar to the training of the word-alignment model.

During operation, the system slices and distributes the bilingual parallel corpus to a number of mapping nodes (operation 502). The mapping nodes can align each word in the source language to a word in the target language, and output the alignment results (operation 504). Given a sentence pair (f, e), with $f=(f_0, f_1, \ldots f_n)$ representing the source language sentence and $e=(e_0, e_1, \ldots e_m)$ representing the target language sentence, the mapping nodes can output the forward and backward alignment results as $(f_i, e_0^m) = \{(f_i, e_0), (f_i, e_1), \ldots, (f_i, e_m)\}$ and $(e_i, f_0^n) = \{(e_i, f_0), (e_i, f_1), \ldots, (e_i, f_n)\}$. In fact, the mapping nodes can output key-value pairs that use the source language word $f_i$ as the key and the target language word $e_j$ as the value and key-value pairs that use target language word $e_j$ as the key and the source language word $f_i$ as the value.

FIGS. 6A-6B present word-alignment tables computed at two different mapping nodes. The first mapping node receives sentence pair "我想买个苹果"/"I want to buy an apple," and outputs the word-alignment table shown in FIG. 6A. The second mapping node receives sentence pair "我想买本书"/"I want to buy a book," and outputs the word-alignment table shown in FIG. 6B. Note that a single word in the source language can be aligned to multiple words in the target language, and vice versa. For example, the Chinese word "想" is aligned to two English words "want to." In the examples shown in FIGS. 6A-6B, only forward word-alignment tables are shown. In practice, the mapping nodes can also output backward word-alignment tables.

Returning to FIG. 5, the word-alignment results (key-value pairs) generated at the mapping nodes can be sorted based on the keys (operation 506). The sorted map-generated key-value pairs can then be distributed to the reduction nodes, with key-value pairs having the same key sent to the same reduction node (operation 508). The reduction nodes can then compute the conditional-translation probabilities for each source language word (key) (operation 510).

In some embodiments, a reduction node can calculate the conditional-translation probability (e.g., the probability that a source language word $f_i$ is aligned to a target language word $e_j$) as:

$$p(f_i | e_j) = \frac{c(f_i, e_j)}{\sum_{k=0}^{m} c(f_i, e_k)},$$

where k is a natural number, and $c(f_i, e_j)$ is the count of word pair $(f_i, e_j)$.

In the example shown in FIGS. 6A and 6B, for the same Chinese word "一个" a particular reduction node may receive the word-alignment result from the first mapping node, aligning the Chinese word "一个" to the English word "an," and receive the word-alignment result from the second mapping node, aligning the Chinese word "一个" to the English word "a." Consequently, the reduction node can compute the conditional-translation probability for both word pairs "一个/a" and "一个/an" as 0.5. On the other hand, because the Chinese word "我" is only aligned to the English word "I" and the Chinese word "想" is only aligned to the English words "want to," the corresponding translation probability for both word pairs is 1.

Returning to FIG. 5, subsequent to obtaining the conditional-translation probabilities, including both forward and backward translation probabilities, the system can generate a word-translation table (512), and enter the phrase-extraction stage. During the phrase-extraction stage, the mapping nodes take the bilingual corpus and the word-translation table as input, and extract, based on certain phrase-extraction rules, phrase pairs from the aligned sentence pairs (operation 514). In some embodiments, the mapping nodes can perform the computations in a parallel fashion and output key-value pairs that use the source language phrase as the key, and use the aligned target language phrase, the count of sentences that contain the source language phrase, the count of sentences that contain the aligned target language phrase, and the count of sentence pairs that contain both the source language phrase and the aligned target language phrase as values. The mapping nodes can also output key-value pairs that use the target language phrase as the key, and use the aligned source language phrase, the count of sentences that contain the target language phrase, the count of sentences that contain the aligned source language phrase, and the count of sentence pairs that contain both the target language phrase and the aligned source language phrase as values.

FIGS. 7A-7B present phrase-alignment tables computed at two different mapping nodes. The first mapping node receives sentence pair "我想买个苹果"/"I want to buy an apple," and extracts, according to certain phrase-extraction rules, aligned phrase pairs shown in FIG. 7A. The second mapping node receives sentence pair "我想买本书"/"I want to buy a book," and extracts, according to certain phrase-extraction rules, aligned phrase pairs shown in FIG. 7B. Different phrase-extraction rules can be used by the mapping nodes to extract phrases. For example, the mapping nodes can first identify the aligned word pairs based on the translation probabilities, and then combine multiple aligned word pairs to obtain the aligned phrase pairs.

Return to FIG. 5. The key-value pairs outputted by the mapping nodes are then sorted and distributed to reduction nodes (operation 516). More specifically, key-value pairs having the same key (e.g., a particular source language phrase or a particular target language phrase) are sent to the same reduction node. For example, target language phrases that are aligned to the same source language phrase according to the forward phrase-alignment results are sent to a particular reduction node. Similarly, source language phrases that are aligned to the same target language phrase according to the backward phrase-alignment results are sent to a different reduction node. This allows the reduction nodes to compute, in parallel, the forward phrase-translation probabilities and the backward phrase-translation probabilities (operation 518). In addition, the reduction nodes can also compute and output the forward joint word-translation probabilities (e.g., the word-translation probabilities for multiple combined words), and compute and output the backward joint word-translation probabilities.

Using data shown in FIGS. 7A and 7B as an example, the source language phrase "买一个" can be used as a key, resulting in the aligned target language phrases "buy an" and "buy a" both being sent to the same reduction node, which can then calculate the phrase-translation probability for both phrase pairs "买一个/buy an" and "买一个/buy a" as 0.5.

Various approaches can be used to compute the joint word-translation probabilities. For example, one can multiply the forward word-translation probabilities of word pairs "买/buy" and "一个/an" to obtain the joint word-translation probability of a word-combination pair "买一个/buy an;" and multiply the forward word-translation probabilities of word pairs "买/buy" and "一个/a" to obtain the joint word-translation probability of a word-combination pair "买一个/buy a."

Considering that during the phrase-extraction operation, the reduction nodes are counting the number of sentences in the entire corpus that contain a particular phrase, it is possible to incorporate the phrase-significance computation into the phrase-extraction process. In other words, while computing the phrase-translation probabilities, the reduction nodes can also perform the phrase-significance computation (operation 520), and filter out redundant or insignificant source language and target language phrases (operation 522). For example, if the occurrence frequency of a particular phrase is below a threshold, the system can consider this phrase insignificant. Subsequently, the system can output the phrase-translation table (operation 524). By not including phrases that are insignificant, redundant, or erroneous in the phrase-translation table, the system can reduce the size of the phrase-translation table.

In addition to performing the word-alignment training and the phrase-extraction training, the distributed system can also be used to train the language model used in the machine translation. In some embodiments, the language model can include an n-gram model, which is a probabilistic model for predicting the next item in a sequence. The training of the n-gram model can involve dividing individual sentences in the corpus into entities of a certain length, called n-grams. In computational linguistics, an n-gram is a continuous sequence of n items from a given sequence of text or speech. For example, a 3-gram can be a sequence of three words, and a 4-gram can be a sequence of four words. The training of the language model can also involve calculating the regression probability and the posterior probability for each n-gram, probability smoothing, and model pruning.

Figure 8:
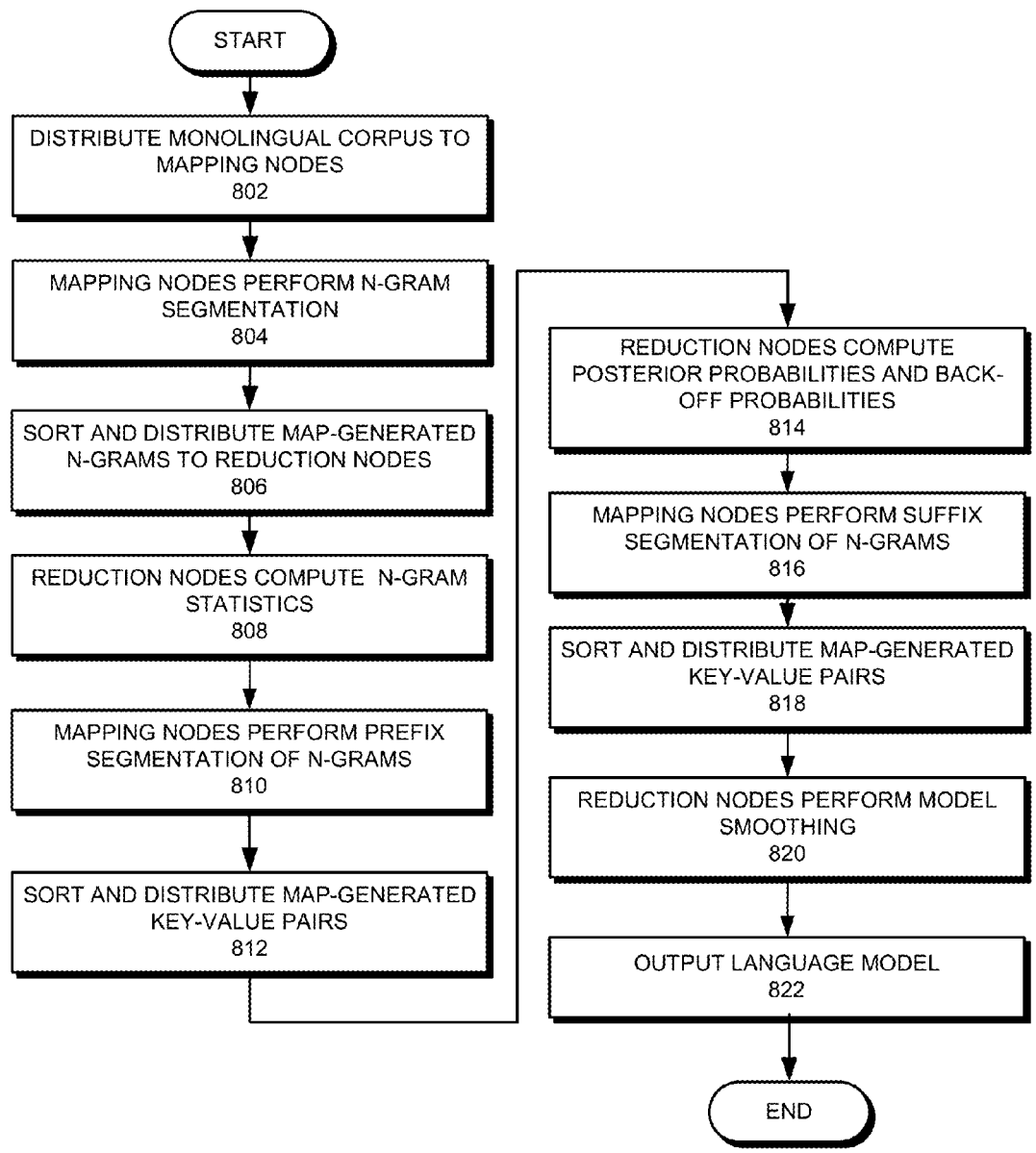
FIG. 8 presents a flowchart illustrating an exemplary process for training a language model, in accordance with an embodiment of the present invention.

FIG. 8 presents a flowchart illustrating an exemplary process for training a language model, in accordance with an embodiment of the present invention. The training of the language model can start with distributing a monolingual corpus to a number of mapping nodes (operation 802). More specifically, the monolingual corpus can be split into many slices, and each slice can be distributed to a mapping node. The mapping nodes can then perform, in parallel, n-gram segmentation, which can involve dividing individual sentences in the corpus into n-grams (n is a natural number) (operation 804). FIG. 9A presents a table showing the n-grams outputted by a mapping node, in accordance with an embodiment of the present invention. The n-grams of the various orders (orders 1, 2, and 3) are segmentation results of a Chinese sentence "我想买个苹果."

Subsequently, the map-generated n-grams are sorted and identical n-grams are sent to the same reduction node (operation 806). The reduction nodes compute the n-gram statistics (operation 808). More specifically, for each n-gram $W_1^n$, the system can output its occurrence frequency $c(W_1^n)$. FIG. 9B presents a table showing the outputs of a reduction node, in accordance with an embodiment of the present invention. For example, the occurrence frequency in the training corpus of bigram "我有" is 2.

The n-grams and their statistics can be used to calculate the posterior probabilities and the back-off probabilities. Both can be useful for subsequent smoothing of the language model. To compute these probabilities, the system first performs prefix segmentation of the n-grams at the mapping nodes (operation 810). The mapping nodes take n-grams and their occurrence frequencies as inputs and output corresponding lower-order grams (i.e., the (n−1)-grams). For example, for an n-gram $W_1^n$, a mapping node can output its n−1 prefix $W_1^{n-1}$, the last word of the n-gram $W_n$, and its occurrence frequency $c(W_1^n)$. The key of the mapping output is the prefix $W_1^{n-1}$. The outputs of the mapping nodes are sorted and the key-value pairs having the same key can be distributed to the same reduction node (operation 812). The reduction nodes calculate the posterior probabilities of the n-grams and their back-off probabilities (operation 814). More specifically, the posterior probability of n-gram $W_1^n$ can be calculated as:

$$u(W_1^n) = \frac{c(W_1^n)}{\sum_X c(W_1^{n-1}X)},$$

with X being a word that follows the n−1 prefix. The back-off probability can be calculated as:

$$b(W_1^{n-1}) = \frac{\sum_{i=1}^{3} d_{ni}|\{X : c(W_1^{n-1}X) = i\}|}{\sum_X c(W_1^{n-1}X)},$$

with $d_{ni}$ being a discount parameter between 0 and 1. The output of the reduction nodes can be $(W_1^n, U(W_1^n), b(W_1^{n-1}))$.

Subsequently, the system performs the smoothing operation to increase the accuracy of the language model. The smoothing operation starts with the mapping nodes performing suffix segmentation of the n-grams (operation 816). For example, an n-gram $W_1^n$ can be segmented as $(W_1^{n-1}, W_n)$, with $W_n$ being the suffix (the last word) of the n-gram. The key of the mapping output is $W_n$. The outputs of the mapping nodes can be sorted and the key-value pairs having the same key (suffix) can be distributed to the same reduction node (operation 818). In other words, n-grams having the same last word can be distributed to the same reduction node. The reduction nodes can then perform the model smoothing (operation 820). In some embodiments, an interpolation technique can be used to smooth the language model. For example, the system can first calculate probabilities of the bigrams, then the trigrams, and so on, until the n-grams of the highest order. In further embodiments, the following formula can be used for probability smoothing: $p(W_n|W_1^{n-1}) = u(W_n|W_1^{n-1}) + b(W_1^{n-1})p(W_n|W_2^{n-1})$. Other smoothing techniques can also be used. After model smoothing, the system can output the language model (operation 822).

In general, the distributed training system can train the various models used by the machine translation system, including the word-alignment, phrase-extraction, and language models. More specifically, the distributed training system can implement the MapReduce algorithm during the training of each model. Multiple MapReduce iterations may be needed to train a particular model. For example, to obtain the word-translation table, multiple MapReduce iterations can be performed until the word-translation probabilities converge. Similarly, to train the language model, the system may perform the first MapReduce iteration to obtain n-gram statistics, a second MapReduce iteration to obtain the language model parameters (e.g., the n-gram probabilities), and then the last MapReduce iteration to smooth the language model.

Figure 10:
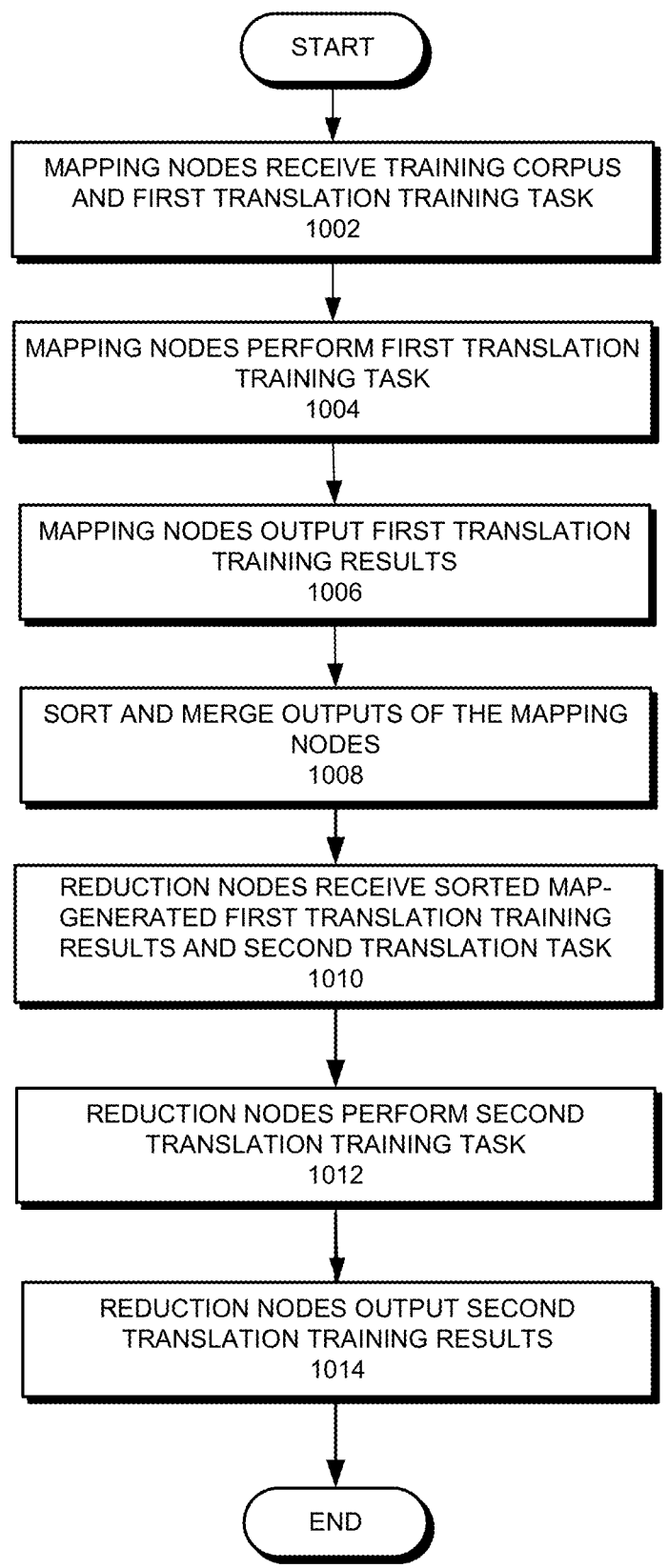
FIG. 10 presents a flowchart illustrating an exemplary MapReduce process, in accordance with an embodiment of the present invention.

FIG. 10 presents a flowchart illustrating an exemplary MapReduce process, in accordance with an embodiment of the present invention. During operation, a corpus distribution server can divide the training corpus and distribute the divided training corpus and a first translation training task to a plurality of mapping nodes (operation 1002). The mapping nodes can then parallelly perform the first translation training task (operation 1004). Depending on the application, the first translation training task can include: computing the forward and backward alignment probabilities (for training the word-alignment model), extracting phrase pairs (for training the phrase-extraction model), and n-gram segmentation (for training the language model).

To train the word-alignment model, in each MapReduce iteration, the reduction nodes output the forward and backward conditional-translation probabilities, which can include a large amount of data. The next mapping iteration involves querying, by a mapping node in real time, those forward and backward conditional-translation probabilities. Such operations can consume a large amount of memory, which can sometimes exceed the memory upper limit at the mapping node. To solve this problem, in some embodiments, the mapping nodes can implement a dynamic loading technique. More specifically, the mapping nodes can dynamically load a portion of the forward and/or backward conditional-translation probabilities into the memory. While computing alignment probabilities, a mapping node can query the memory for needed data. If the needed forward and/or backward probabilities cannot be located in the memory, the mapping node can load such data from the hard disk.

Subsequent to performing the first translation training task, the mapping nodes can output first translation training results (operation 1006). The system can sort and merge the first translation training results based on a first key, which can correspond to a particular language element (operation 1008). For example, if the first translation training task is to compute the forward translation probabilities during word alignment, the first key can be the source language word. Similarly, if the first translation training task is to compute the backward translation probabilities, the first key can be the target language word. If the first translation training task is n-gram segmentation, the first key can be the n-gram.

Subsequently, the system distributes the sorted first translation training results and the second translation training task to the reduction nodes (operation 1010). First translation training results corresponding to the same language element (e.g., a particular first key) can be distributed to the same reduction node. Depending on the application, the second translation training task can include: computing the forward and backward conditional-translation probabilities (for training the word-alignment model), computing the forward and backward phrase-translation probabilities (for training the phrase-extraction model), and computing the n-gram statistics (for training the language model).

The reduction nodes can then parallelly perform the second translation training task (operation 1012) and output the second translation training results (operation 1014). For certain applications, the second translation training results outputted by the reduction nodes can include a large amount of data, causing difficulties in transportation of the training results. For example, while training the word-alignment model, the forward and backward conditional probabilities outputted by the reduction nodes can account for a large amount of data. These probabilities are needed by the mapping nodes at the next iteration, thus requiring a large amount of memory at the mapping nodes to store these probabilities. To reduce the memory needs, in some embodiments, before the reduction nodes output the second translation training results, the system compresses the second translation training results using one or more data compression techniques.

In some embodiments, the data compression technique can include a lossy compression technique that rounds off nonessential bits of data. One approach is to round off the translation probabilities to a predetermined place value after the decimal point. For example, the system can round off a forward translation probability of "0.123456" to two digits after the decimal point. Hence, after compression this forward translation probability can be recorded as "0.12."

Another approach is to remove translation probabilities that are below a predetermined threshold. For example, the predetermined threshold can be set as 0.1, and any forward or backward translation probabilities that are less than 0.1 can be removed from the outputs of the reduction nodes. In addition, the system can remove portions of the second translation training results that correspond to predetermined special characters. For example, the system may define "!" as a special character, and any translation probabilities that involve "!" can be removed from the second translation training results.

In some embodiments, the data compression technique can also include a lossless technique. More specifically, the system can convert a matrix expression to a string expression. For example, the forward translation probabilities of one source language word with respect to a number of target language words typically can be expressed as a diagonal matrix. To reduce the size of the output data file, the system can convert such a diagonal matrix into a string led by the source language word and followed by the target language words and their corresponding translation probabilities. A diagonal matrix shown below

|   | I | Want | To | Buy | An | Apple |
|---|---|------|----|----|-----|-------|
| 我 | 5/7 | | | | | |
| 我 | | 1/7 | | | | |
| 我 | | | 1/7 | | | |
| 我 | | | | 1/7 | | |
| 我 | | | | | 1/7 | |
| 我 | | | | | | 1/7 | can be converted to a string format as "我-I-5/7-Want-1/7-To-1/7-Buy-1/7-An-1/7-Apple-1/7."

By compressing the data file outputted by the reduction nodes, the system can increase the data transportation efficiency and reduce the amount of memory consumed by the mapping nodes during iterations, thus significantly increasing the training efficiency.

Figure 11:
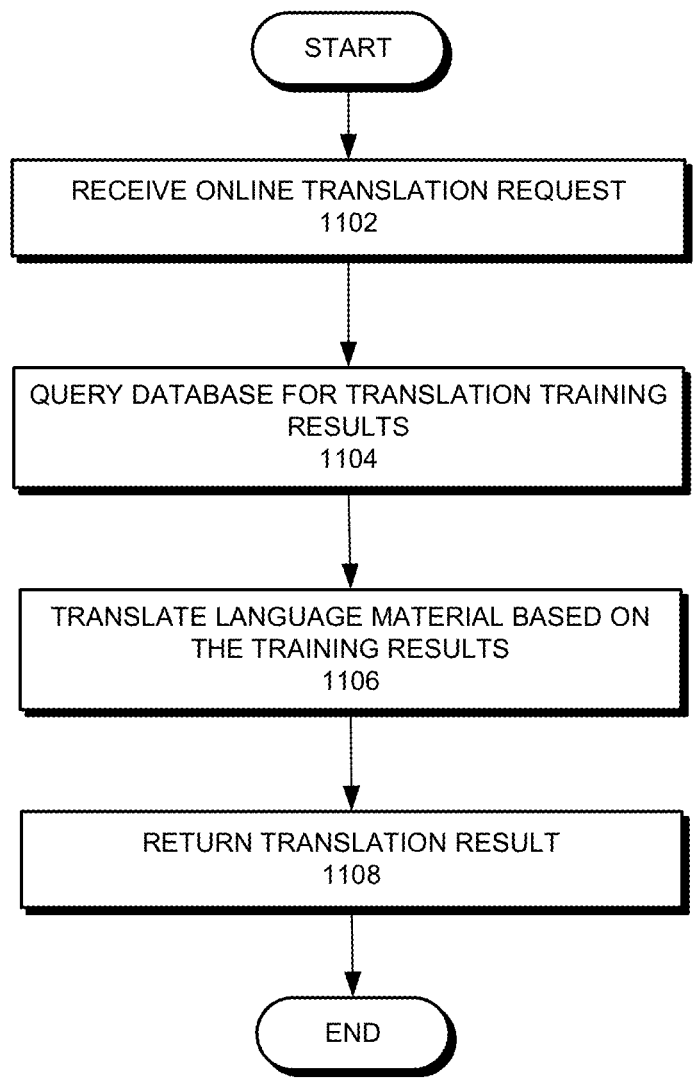
FIG. 11 presents a flowchart illustrating an exemplary online translation process, in accordance with an embodiment of the present invention.

Once the various models are trained using the distributed training system, the SMT system can be used for online translation. FIG. 11 presents a flowchart illustrating an exemplary online translation process, in accordance with an embodiment of the present invention. During operation, the SMT system can receive, from a user, a request for online translation (operation 1102). Based on the request, the SMT system queries, in parallel, the different segments of a database for the translation training results corresponding to the to-be-translated language material (operation 1104). In some embodiments, the different segments of the database can be used to store the translation training results outputted by different reduction nodes of the SMT system. For example, one database segment can correspond to one reduction node, storing the translation training results outputted by that reduction node. Subsequently, the SMT system decodes/translates the to-be-translated language material based on the translation training results to obtain the online translation result (operation 1106), and returns the translation result to the user (operation 1108).

Computer and Communication System

Figure 12:
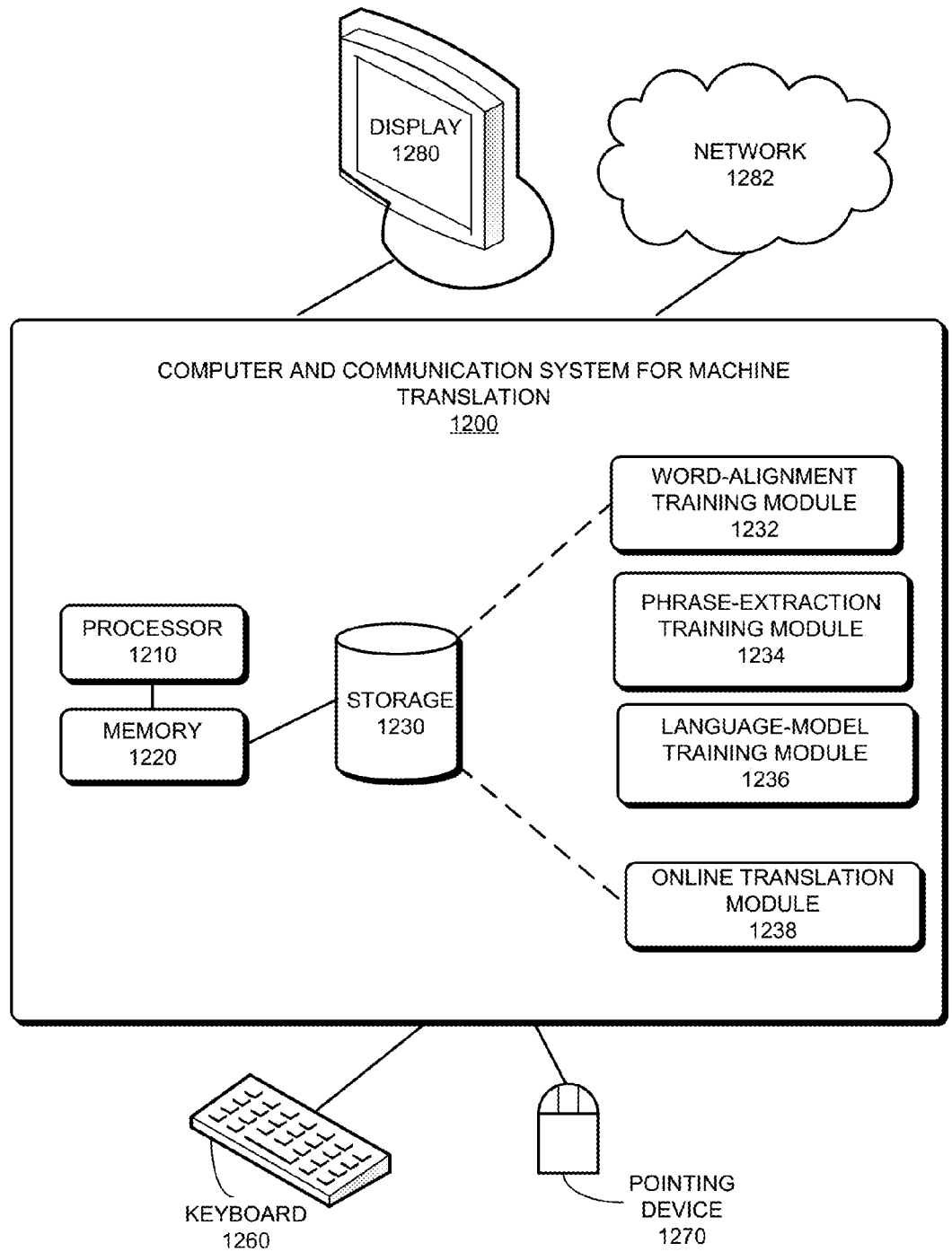
FIG. 12 illustrates an exemplary computer and communication system for machine translation, in accordance with an embodiment of the present invention.

FIG. 12 illustrates an exemplary computer and communication system for machine translation, in accordance with an embodiment of the present invention. In FIG. 12, system 1200 includes a processor 1210, a memory 1220, and a storage 1230. Storage 1230 typically stores instructions that can be loaded into memory 1220 and executed by processor 1210 to perform the methods mentioned above. As a result, system 1200 can perform the functions described above.

In one embodiment, the instructions in storage 1230 can implement a word-alignment training module 1232, a phrase-extraction training module 1234, a language-model training module 1236, and an online translation module 1238, all of which can be in communication with each other through various means.

Word-alignment training module 1232 can be used to train the word-alignment model. Phrase-extraction training module 1234 can be used to train the phrase-extraction model. Language-model training module 1236 can be used to train the language model. Online translation module 1238 can be used to perform the online translation task.

In some embodiments, modules 1232, 1234, 1236, and 1238 can be partially or entirely implemented in hardware and can be part of processor 1210. Further, in some embodiments, the system may not include a separate processor and memory. Instead, in addition to performing their specific tasks, modules 1232, 1234, 1236, and 1238, either separately or in concert, may be part of general- or special-purpose computation engines.

System 1200 can be coupled to an optional display 1280 (which can be a touchscreen display), keyboard 1260, and pointing device 1270, and can also be coupled via one or more network interfaces to network 1282.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. A computer-executable method for training a machine translation system, comprising:
    distributing, by a computer, a first translation training task and a training corpus to a first set of servers, wherein a respective first server is configured to:
        receive a portion of the training corpus; and
        perform the first translation training task on the received portion of the training corpus;
    receiving, from the first set of servers, first translation training results; and
        distributing a second translation training task and the first translation training results to a second set of servers, wherein a respective second server is configured to:
            receive a subset of the first translation training results that correspond to a same language element;
            perform the second translation training task on the received subset of the first translation training results; and
            output second translation training results.

2. The method of claim 1,
    wherein the training corpus includes a bilingual corpus, wherein the first translation training task involves one or more of:
        computing a forward word-alignment probability indicating a likelihood that a source language word is aligned to a target language word; and
        computing a backward word-alignment probability indicating a likelihood that a target language word is aligned to a source language word; and
    wherein the first translation training results include one or more of:
        the computed forward word-alignment probability; and
        the computed backward word-alignment probability.

3. The method of claim 2, wherein the second translation training task involves one or more of:
    computing a forward conditional translation probability indicating a likelihood that a source language word being translated into a target language word; and
    computing a backward conditional translation probability indicating a likelihood that a target language word being translated into a source language word.

4. The method of claim 2, wherein the language element is a source language word if the to-be-distributed first translation training results are forward word-alignment probabilities, and wherein the language element is a target language word if the to-be-distributed first translation training results are backward word-alignment probabilities.

5. The method of claim 2, further comprising:
    distributing the second translation training results to the first set of servers;
    in response to the first set of servers determining that the computed forward and/or backward conditional translation probabilities do not converge, updating the forward and/or backward word-alignment probabilities; and
    in response to the first set of servers determining that the computed forward and/or backward conditional translation probabilities converge, outputting a word-alignment table based on the computed forward and/or backward conditional translation probabilities.

6. The method of claim 1,
    wherein the training corpus includes a bilingual corpus;
    wherein the first translation training task involves:
        extracting, from a sentence pair belonging to the bilingual training corpus, one or more pairs of phrases; and
        outputting occurrence frequencies of the phrases; and
    wherein the second translation training task involves one of:
        computing a forward phrase-translation probability between a source language phrase and a target language phrase; and
        computing a backward phrase-translation probability between a target language phrase and a source language phrase.

7. The method of claim 6, further comprising:
    in response to determining that an occurrence frequency of an extracted phrase is less than a predetermined threshold, removing corresponding phrase pairs.

8. The method of claim 1, wherein the training corpus includes a monolingual corpus, wherein the first translation training task involves performing n-gram segmentations over the monolingual corpus, wherein the first translation training results include segmented n-grams, wherein the second translation training task involves computing n-gram statistics, and wherein the second translation training results include occurrence frequencies of the segmented n-grams.

9. The method of claim 1, wherein the training corpus includes n-grams obtained from segmenting a monolingual corpus, wherein the first translation training task involves performing prefix segmentation of the n-grams, wherein the first translation training results include prefixes of the n-grams, and wherein the second translation training task involves computing posterior probabilities and/or back-off probabilities of the n-grams.

10. The method of claim 1, wherein the training corpus includes n-grams obtained from segmenting a monolingual corpus, wherein the first translation training task involves performing suffix segmentation of the n-grams, wherein the first translation training results include suffixes of the n-grams, and wherein the second translation training task involves smoothing probabilities of the n-grams.

11. A computer system, comprising:
a task distribution server;
a plurality of mapping servers; and
a plurality of reduction servers;
wherein the task distribution server is configured to:
distribute a first translation training task and a training corpus to the mapping servers; and
distribute a second translation training task and first translation training results received from the mapping servers to the reduction servers;
wherein a respective mapping server is configured to:
receive a portion of the training corpus; and
perform the first translation training task on the received portion of the training corpus; and
wherein a respective reduction server is configured to:
receive a subset of the first translation training results that correspond to a same language element;
perform the second translation training task on the received subset of the first translation training results; and
output second translation training results.

12. The computer system of claim 11, wherein the training corpus includes a bilingual corpus, wherein the first translation training task involves one or more of:
computing a forward word-alignment probability indicating a likelihood that a source language word is aligned to a target language word; and
computing a backward word-alignment probability indicating a likelihood that a target language word is aligned to a source language word; and
wherein the first translation training results include one or more of:
the computed forward word-alignment probability; and
the computed backward word-alignment probability.

13. The computer system of claim 12, wherein the second translation training task involves one or more of:
computing a forward conditional translation probability indicating a likelihood that a source language word being translated into a target language word; and
computing a backward conditional translation probability indicating a likelihood that a target language word being translated into a source language word.

14. The computer system of claim 12, wherein the language element is a source language word if the to-be-distributed first translation training results are forward word-alignment probabilities, and wherein the language element is a target language word if the to-be-distributed first translation training results are backward word-alignment probabilities.

15. The computer system of claim 12, wherein the task distribution server is further configured to distribute the second translation training results to the mapping servers, wherein the mapping server is further configured to:
in response to determining that the computed forward and/or backward conditional translation probabilities do not converge, update the forward and/or backward word-alignment probabilities; and
in response to determining that the computed forward and/or backward conditional translation probabilities converge, output a word-alignment table based on the computed forward and/or backward conditional translation probabilities.

16. The computer system of claim 11, wherein the training corpus includes a bilingual corpus;
wherein the first translation training task involves:
extracting, from a sentence pair belonging to the bilingual training corpus, one or more pairs of phrases; and
outputting occurrence frequencies of the phrases; and
wherein the second translation training task involves one of:
computing a forward phrase-translation probability between a source language phrase and a target language phrase; and
computing a backward phrase-translation probability between a target language phrase and a source language phrase.

17. The computer system of claim 16, wherein the reduction server is further configured to, in response to determining that an occurrence frequency of an extracted phrase is less than a predetermined threshold, remove corresponding phrase pairs.

18. The computer system of claim 11, wherein the training corpus includes a monolingual corpus, wherein the first translation training task involves performing n-gram segmentations over the monolingual corpus, wherein the first translation training results include segmented n-grams, wherein the second translation training task involves computing n-gram statistics, and wherein the second translation training results include occurrence frequencies of the segmented n-grams.

19. The computer system of claim 11, wherein the training corpus includes n-grams obtained from segmenting a monolingual corpus, wherein the first translation training task involves performing prefix segmentation of the n-grams, wherein the first translation training results include prefixes of the n-grams, and wherein the second translation training task involves computing posterior probabilities and/or back-off probabilities of the n-grams.

20. The computer system of claim 11, wherein the training corpus includes n-grams obtained from segmenting a monolingual corpus, wherein the first translation training task involves performing suffix segmentation of the n-grams, wherein the first translation training results include suffixes of the n-grams, and wherein the second translation training task involves smoothing probabilities of the n-grams.

* * * * *